United States Patent [19]

Hori et al.

[11] Patent Number: 5,514,765
[45] Date of Patent: May 7, 1996

[54] ROOM TEMPERATURE-CURING SILICONE ELASTOMER COMPOSITION

[75] Inventors: Seiji Hori; Hidekatsu Hatanaka; Toshio Saruyama, all of Chiba, Japan

[73] Assignee: Dow Corning Toray Silicone Co., LTD., Tokyo, Japan

[21] Appl. No.: 504,280

[22] Filed: Jul. 19, 1995

[30] Foreign Application Priority Data

Jul. 22, 1994 [JP] Japan .................................. 6-192128

[51] Int. Cl.$^6$ .................................................. C08G 77/08
[52] U.S. Cl. .............................. 528/18; 524/788; 528/15; 528/17; 528/21; 528/33; 528/901
[58] Field of Search ................................. 528/18, 33, 901, 528/17, 15, 21; 524/788

[56] References Cited

U.S. PATENT DOCUMENTS

| 4,687,829 | 8/1987 | Chaffee et al. | 528/17 |
| 4,965,333 | 10/1990 | Inouye et al. | 528/33 |
| 5,300,612 | 4/1994 | Saruyama | 528/17 |

FOREIGN PATENT DOCUMENTS 83167  4/1988  Japan .

OTHER PUBLICATIONS

European Search Report, Sep. 11, 1995.

Primary Examiner—Melvyn I. Marquis
Attorney, Agent, or Firm—Roger H. Borrousch

[57] ABSTRACT

A room temperature-curing silicone elastomer composition which has excellent workability before curing and forms a silicone elastomer after curing which exhibits low modulus and high elongation. This composition contains a hydroxyl-capped polydiorganosiloxane, a siloxane chain extender of the formula $$R^1(R^2{}_n R^3{}_{(3-n)}SiO)Si(OR^4)_2$$

in which $R^1$, $R^2$, and $R^3$ are aliphatic monovalent hydrocarbon groups, $R^4$ is a hydrocarbon group having from 1 to 8 carbon atoms per group, and n is 0 or 1, an alkoxysilane crosslinker, and a curing catalyst.

18 Claims, No Drawings

ROOM TEMPERATURE-CURING SILICONE ELASTOMER COMPOSITION

BACKGROUND OF THE INVENTION

1. Field of the Invention

Area of the application in industry

The present invention relates to a room temperature-curing silicone elastomer composition, and specifically, relates to a room temperature-curing silicone elastomer composition which can be cured at room temperature to become a low modulus and high elongation silicone elastomer.

2. Background Information

Conventional technology and problems

Compositions which can be cured at room temperature to become silicone elastomer have been known previously, and used widely in industries. The known mechanisms of room temperature curing are the mechanism of hydrosilylation reaction, the curing mechanism of ultraviolet radiation, the curing mechanism of condensation reaction of silanol groups and silicon-bonded functional groups. Among these, the silicone elastomer composition which is cured by the mechanism of the condensation reaction is featured in that its adhesive properties can be realized easily at room temperature, its curing is hardly inhibited by impurities in the curing atmosphere, it can be cured in a short time simply by mixing the principal agent and the curing agent, it can be stored stably for extended time as one liquid type composition, it can be cured by leaving in air, and so forth, and has been used widely as an adhesive, coating agent, and sealing agent. However, because of the requirement for maintaining the workability of manual operation such as mixing, injecting, and finishing, before curing, there has been a problem in that the mechanical characteristics are limited. Specifically, the molecular weight of polydiorganosiloxane, the principal constituent, has to be limited below a certain level in order to provide easy workability, and because of this limitation, it has been difficult to reduce stiffness of the cured elastomer shown by such characteristics as hardness, and modulus under a certain level. The easiest method to solve this problem has been the addition of non-reactive polydiorganosiloxane. However, this method has faults such that the added non-reactive polydiorganosiloxane oozes out to the surface after curing, and adhesive properties are impaired, and so forth. Another method to solve this problem has been that, by using multifunctional bridging agent and bifunctional chain extension agent together, bridging is carried out while the chain of the polydiorganosiloxane is being extended during the curing reaction, and the crosslinking density after curing is reduced. Two methods have been proposed for this purpose, namely (1) the method in which siloxane having two N,N-dialkylaminoxy groups in a molecule and siloxane having three N,N-dialkylaminoxy groups in a molecule are used together, and (2) the method in which silane having two N-alkylacetoamide groups in a molecule and silane having three N-alkylacetoamide groups in a molecule are used together. However, these methods have had problems. In the first proposal, that is, in the method in which N,N-dialkylaminoxy groups are used, N,N-dialkylhydroxyamine is produced during curing reaction as the by-product. The unpleasant smell of this hydroxylamine has been the problem. Furthermore, the hydroxylamine is strongly basic, and whenever the atmospheric temperature rises slightly, it causes scission of polydiorganosiloxane molecules, and the curing is inhibited; this has been a grave problem. Also, since the siloxane having N,N-dialkylaminoxy groups is expensive, this is an economical disadvantage. In the second proposal, that is, in the method in which N-alkylacetoamide groups are used, the unpleasant smell of N-alkylacetoamide during curing has also been a problem. Furthermore, when there is active hydrogen-containing compound such as alcohol in the mixture environment, N-alkylacetoamide group causes substitution reaction with such groups as the alkoxy group, and as a result, it inhibits the curing; which has been the problem. Further, since the silane having N-alkylacetoamide groups is expensive, this is also an economical disadvantage. Instead of using such special and expensive functional groups as seen in these two proposals, it has also been proposed to carry out chain extension and bridging using functional group which has been widely used previously and also does not cause side reaction. In JP (Kokai) 63-83167, published Apr. 13, 1988, a method has been proposed to use a chain extension agent such as $RNHCH_2MeSi(OMe)_2$. However, since it is extremely difficult to manufacture this chain extension agent economically, and in addition, it is difficult to balance it stably with the bridging agent, it could not be put to practical use. Also, in JP (Kokai) 6-9875, published Jan. 18, 1994, (U.S. Pat. No. 5,300,612, issued Apr. 5, 1994, to Saruyama), a method has been proposed to use as a chain extension agent such as $[(CH_3)_3SiO]_2Si(OMe)_2$. However, when this chain extension agent was actually used, increase of modulus after degradation test was found to be too large to be put to practical use. Also, in U.S. Pat. No. 4,687,829, issued Aug. 18, 1987, to Chaffee et al, a method has been proposed to use $Ph[(CH_3)_3SiO]Si(OCH_3)_2$, but the physical properties at the initial stage did not be reach the level obtainable by using N,N-dialkylaminoxy group.

SUMMARY OF THE INVENTION

Problems to be solved by the invention

The present inventors have carried out intensive studies to solve the aforesaid problems, and as a result, reached this invention.

Namely, the objective of the present invention is to provide a room temperature-curing silicone elastomer composition which has excellent workability before curing, and can form a low modulus and high elongation silicone elastomer after curing.

Method to solve the problems and its function

The present invention relates to a room temperature-curing silicone elastomer composition comprising (A) 100 parts by weight of a silanol terminated substantially straight chain polyorganosiloxane having a viscosity at 25° C. of from 0.00002 to 1 m²/s, (B) 0.1 to 20 parts by weight per 100 parts by weight of (A) of a siloxane expressed by the formula $$R^1(R^2{}_nR^3{}_{(3-n)}SiO)Si(OR^4)_2$$

in which $R^1$, $R^2$, and $R^3$ are aliphatic monovalent hydrocarbon groups, $R^4$ is a hydrocarbon group having from 1 to 8 carbon atoms per group, and n is 0 or 1, (C) 0.01 to 20 parts by weight per 100 parts by weight of (A) of an organosilane expressed by 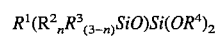 where $R^4$ is the same as defined in (B), and $R^5$ is a monovalent hydrocarbon group having from 1 to 20 carbon atoms per group, and a is 3 or 4, or its partially hydrolyzed product, and (D) 0.01 to 20 parts by weight per 100 parts by weight of (A) of a curing catalyst.

DETAILED DESCRIPTION OF THE PREFERRED EMBODIMENTS

The (A) ingredient used in this invention, the polyorganosiloxane, is a substantially straight chain polyorganosiloxane capped with silanol groups. Here, it is meant by "substantially straight chain" that it can be not only a perfectly straight chain polymer, i.e. linear, but it may also be a somewhat branched straight chain. Organic groups bonded to silicon atoms in this polyorganosiloxane can be alkyl groups such as methyl, ethyl, propyl, butyl, and octyl, alkenyl groups such as vinyl, allyl, and hexenyl, aryl groups such as phenyl and tolyl, benzyl, substituted alkyl groups such as 3,3,3-trifluoropropyl, 3-chloropropyl, 3-cyanopropyl, and chloromethyl. If the viscosity of this polyorganosiloxane is too low, rubber elasticity of the cured sealant is low, and if the viscosity is too high, the extrusion load becomes heavy and the discharging operation from containers such as cartridges becomes difficult, and therefore, the viscosity at 25° C. should be in the range of 0.00002 to 1 $m^2/s$, and preferably in the range of 0.0001 to 0.1 $m^2/s$.

The (B) ingredient, the siloxane having two hydrolyzable groups, functions as the chain extension agent for (A). This siloxane is expressed by the formula $$R^1(R^2{}_nR^3{}_{(3-n)}SiO)Si(OR^4)_2$$

in which $R^1$, $R^2$, and $R^3$ are aliphatic monovalent hydrocarbon groups, $R^4$ is a monovalent hydrocarbon group of carbon number 1 to 8, and n is 0 or 1. $R^1$ and $R^2$ are preferably vinyl or methyl, and $R^3$ is preferably methyl. For $R^4$, preferably methyl, ethyl, or normal propyl is used, and it can be selected by considering the curing rate. For $R^4$, a monovalent hydrocarbon group having unsaturated linkage can also be used. Specifically, (B) can be illustrated by $$CH_2=CH[CH_2=CH(CH_3)_2SiO]Si(OCH_3)_2$$

$$CH_2=CH[CH_2=CH(CH_3)_2SiO]Si(OC_2H_5)_2$$

$$CH_2=CH[(CH_3)_3SiO]Si(OCH_3)_2$$

$$CH_3[(CH_3)_3SiO]Si(OCH_3)_2.$$

The amount of (B) is determined by considering the balance with (C) for obtaining the required physical properties of the cured silicone elastomer, the amount of silanol in (A), materials added other than (A)-(D), and impurities such as water contained in these ingredients. The amount required is from 0.1 to 20 parts by weight per 100 parts by weight of (A). If it is less than this, the curing may not be sufficient, or the desired elongation may not be obtained. If it exceeds 20 parts by weight, the curing may be too slow, or the curing may not be completed.

The (C) ingredient functions as the crosslinking agent for (A). This crosslinking agent is an organosilane expressed by $R^5{}_{4-n}Si(OR^4)_n$ where $R^4$ is the same as defined above $R^5$ is a monovalent hydrocarbon of 1 to 20 carbon atoms, and n is 3 or 4, or its partially hydrolyzed product. Specifically, (C) can be illustrated by tetramethoxysilane, tetraethoxysilane, tetraisopropoxysilane, methyltrimethoxysilane, vinyltrimethoxysilane, decyltrimethoxysilane, methyltriethoxysilane, phenyltrimethoxysilane, and methyltri(ethoxymethoxy) silane. Preferably, one of these compound is selected as (C), but two or more of them can be added as needed. Also, partially hydrolyzed products of these compounds can be used. The amount of (C) is determined by considering the balance with (B) for the required physical properties after the curing, the amount of silanol in (A), materials added other than (A)-(D), and impurities such as water contained in these ingredients. The amount required is from 0.01 to 20 parts by weight per 100 parts by weight of (A). If the amount is less than 0.01 part by weight, incomplete curing arises. If it exceeds 20 parts by weight, curing is too slow and modulus is too high.

The (D) ingredient is a catalyst to promote curing between (A) and (B) and (C). Any previously known catalyst for promoting the curing reaction of (A) and (C) can be used as long as the functions of the composition of the present invention are not impaired. (D) can be a tin base catalyst such as dialkyltincarboxylate, dialkyltinbis(acetylacetonate), or tin octylate [$Sn(OOCC_7H_{15})_2$], or other catalysts such as iron octylate, zirconium octylate, titanate esters such as tetrabutyltitanate, tetra(isopropyl)titanate, and dibutoxytitaniumbis(acetylacetonate), or an amine base catalyst such as tetramethylguanidine. Among these, tin base catalysts are preferable. Preferably, (D) is used as a single kind of catalyst, but two or more kinds of catalysts can also be used. Also, when two or more kinds of catalysts are used, it is preferable to use a mixture of a tetravalent tin catalyst, such as dibutyltinbisacetylacetonate, and a divalent tin catalyst such as tin octylate, where the ratio of these compounds is within the range of 9:1 to 1:9. The amount of (D) should be 0.01 to 20 parts by weight per 100 parts by weight of (A). If it is less than 0.01 part by weight, it is not enough to promote curing, and also, if it exceeds 20 parts by weight, many problems such as degradation of water resistance or heat resistance arise.

In the composition of the present invention, in addition to the ingredients recited for (A)-(D), there can be added as needed polydiorganosiloxane which does not have silanol group, polydiorganosiloxane which has silanol group only at one end, inorganic fillers such as fumed silica, precipitation silica, quartz fine powder, carbon black, and calcium carbonate and the hydrophobicized versions of these fillers, silicone resin, fluidity regulator, silane base or siloxane base tackifier, pigment, heat-resisting agent, flame retardant, and organic solvent.

The mixing order of (A)-(D) to make the room temperature-curing silicone elastomer composition of the present invention is preferably in such a manner that the (B), (C), and (D) are added to the (A) constituent in that order, or (B)-(D) are added all at the same time to (A). Otherwise, the desired characteristics, in particular, the elongation after curing may not be obtained. Except this point, there is no particular limitation in the order of mixing.

The aforesaid composition of the present invention has excellent workability before curing and forms a low modulus and high elongation silicone rubber after curing. Therefore, the composition of the present invention is particularly useful as an adhesive, coating material, or sealing material.

In the following, the present invention is explained by Examples and Comparison Examples. The viscosity in the Examples and the Comparison Examples is the value at 25° C., part or parts are by weight and float glass was used as the substrate material to be bonded. Also, Me represents methyl, and Vi represents vinyl.

EXAMPLE 1

A room temperature-curing silicone elastomer composition was prepared by sufficiently mixing 100 parts of silanol-capped polydimethylsiloxane, having a viscosity 0.012 m²/s, and 100 parts of colloidal calcium carbonate, and amounts of alkoxysilane expressed by the formula, $C_{10}H_{21}Si(OMe)_3$, siloxane expressed by the formula, $Vi(ViMe_2SiO)Si(OMe)_2$, and dibutyltinbisacetylacetonate as shown in Table 1. The physical properties of this composition were measured according to the method specified in JIS A5758, sealing material for construction. Namely, test pieces were prepared according to the method specified in JIS A5758, paragraph 4.9, and the tensile adhesion tests were carried out. Results of these measurements were as shown in Table 1.

EXAMPLE 2

A room temperature-curing silicone elastomer composition was prepared by sufficiently mixing 100 parts of silanol-capped polydimethylsiloxane, having a viscosity of 0.012 m²/s, 100 parts colloidal calcium carbonate, and amounts of alkoxysilane expressed by the formula, $ViSi(OMe)_3$, siloxane expressed by the formula, $Vi(ViMe_2SiO)Si(OMe)_2$, and tin catalyst as shown in Table 1. Here, the tin catalyst used was a mixture of dibutyltinbisacetylacetonate, a tetravalent tin and tin octylate, a divalent tin, in the ratio of 10/3. The characteristics of this composition were measured by the same manner as Example 1. Results of these measurements were as shown in Table 1.

EXAMPLE 3

A room temperature-curing silicone elastomer composition was prepared by sufficiently mixing 100 parts of silanol-capped polydimethylsiloxane having a viscosity is 0.012 m²/s, 100 parts colloidal calcium carbonate, amounts of alkoxysilane expressed by the formula, $C_{10}H_{21}Si(OMe)_3$, siloxane expressed by the formula, $Vi(ViMe_2SiO)Si(OMe)_2$, and tin catalyst as shown in Table 1. Here, the tin catalyst used was a mixture of dibutyltinbisacetylacetonate, a tetravalent tin, and tin octylate, a divalent tin, in the ratio of 10/3. The characteristics of this composition were measured in the same manner as Example 1. Results of these measurements were as shown in Table 1. Also, after the completion of the initial stage curing, degradation tests (physical properties after heating at 90° C. for a week, and physical properties after soaking in warm water of 50° C. for a week) were carried out, and the results were as shown in Table 2.

EXAMPLE 4

A room temperature-curing silicone elastomer composition was prepared by sufficiently mixing 100 parts of silanol-capped polydimethylsiloxane having a viscosity of 0.012 m²/s, 100 parts of colloidal calcium carbonate, and amounts of alkoxysilane expressed by the formula, $C_{10}H_{21}nSi(OMe)_3$, siloxane expressed by the formula, $Vi(Me_3SiO)Si(OMe)_2$, and tin catalyst shown in Table 1. Here, the tin catalyst used was a mixture of dibutyltinbisacetylacetonate, a tetravalent tin, and tin octylate, a divalent tin, in the ratio of 10/3. The characteristics of this composition were measured in the same manner as Example 1. Results of these measurements were as shown in Table 1.

EXAMPLE 5

A room temperature-curing silicone elastomer composition was prepared after sufficiently mixing 100 parts of silanol-capped polydimethylsiloxane having a viscosity of 0.012 m²/s, 100 parts of colloidal calcium carbonate, and amounts of alkoxysilane expressed by the formula, $C_{10}H_{21}Si(OMe)_3$, siloxane expressed by the formula, $Me(Me_3SiO)Si(OMe)_2$, and tin catalyst shown in Table 1. Here, the tin catalyst used was a mixture of dibutyltinbisacetylacetonate, a tetravalent tin, and tin octylate, a divalent tin, in the ratio of 10/3. The characteristics of this composition were measured in the same manner as Example 1. Results of these measurements were as shown in Table 1.

COMPARISON EXAMPLE 1

A room temperature-curing silicone elastomer composition was prepared after sufficiently mixing 100 parts of silanol-capped polydimethylsiloxane having a viscosity of 0.012 m²/s, 100 parts of colloidal calcium carbonate, and amounts of alkoxysilane expressed by the formula, $C_{10}H_{21}Si(OMe)_3$ and tin catalyst shown in Table 1. Here, the tin catalyst used was a mixture of dibutyltinbisacetylacetonate, a tetravalent tin, and tin octylate, a divalent tin, in the ratio of 10/3. The characteristics of this composition were measured in the same manner as Example 1. Results of these measurements were as shown in Table 1.

COMPARISON EXAMPLE 2

A room temperature-curing silicone elastomer composition was prepared after sufficiently mixing 100 parts of silanol-capped polydimethylsiloxane having a viscosity of 0.012 m²/s, 100 parts colloidal calcium carbonate, amounts of alkoxysilane expressed by the formula, $C_{10}H_{21}Si(OMe)_3$, siloxane expressed by the formula, $(Me_3SiO)_2Si(OMe)_2$, and tin catalyst shown in Table 2. Here, the tin catalyst used was a mixture of dibutyltinbisacetylacetonate, a tetravalent tin, and tin octylate, a divalent tin, in the ratio of 10/3. The characteristics of this composition were measured in the same manner as Example 1. Results of these measurements were shown in Table 2. Also, after the completion of the initial stage curing, degradation tests (physical properties after heating at 90° C. for a week, and physical properties after soaking in warm water of 50° C. for a week) were carried out, and the results were as shown in Table 2.

TABLE 1

|  | EXAMPLE 1 | EXAMPLE 2 | EXAMPLE 3 | EXAMPLE 4 | EXAMPLE 5 | COMPARISON EXAMPLE 1 |
|---|---|---|---|---|---|---|
| $C_{10}H_{21}Si(OMe)_3$* | 0.09 | — | 0.09 | 0.09 | 0.09 | 2 |
| $ViSi(OMe)_3$ | — | 0.06 | — | — | — | — |
| $Vi(ViMe_2SiO)Si(OMe)_2$ | 1.4 | 1.4 | 1.4 | — | — | |
| $Vi(Me_3SiO)Si(OMe)_2$ | — | — | — | 1.4 | — | |
| $Me(Me_3SiO)Si(OMe)_2$ | — | — | — | — | 2 | — |
| Dibutyltinbisacetyl-acetonate | 0.26 | 0.2 | 0.2 | 0.2 | 0.2 | 0.2 |
| Tin octylate | — | 6 | 0.06 | 0. | 6 | |

TABLE 1-continued

|  | EXAMPLE 1 | EXAMPLE 2 | EXAMPLE 3 | EXAMPLE 4 | EXAMPLE 5 | COMPARISON EXAMPLE 1 |
|---|---|---|---|---|---|---|
| PHYSICAL PROPERTIES |  |  |  |  |  |  |
| 50% MODULUS, kgf/cm$^2$ | 1.0 | 1.3 | 1.4T | 1.1 | 1.7 | 3.1 |
| Tensile Strength kgf/cm$^2$ | 5.1 | 7.3 | 7.7 | 7.4 | 6.6 | 7.2 |
| Extension, % | 991 | 741 | 851 | 891 | 730 | 181 |
| CP rate | 100 | 100 | 100 | 100 | 100 | 100 |

*ingredients in table are in parts by weight

TABLE 2

|  | EXAMPLE 3 | COMPARISON EXAMPLE 2 |
|---|---|---|
| C$_{10}$H$_{21}$Si(OMe)$_3$ | 0.09 | 1 |
| Vi(ViMe$_2$SiO)Si(OMe)$_2$ | 1.4 | — |
| Me(Me$_3$SiO)Si(OMe)$_2$ | — | 2 |
| Dibutyltinbisacetyl-acetonate | 0.2 | 0.2 |
| Tin octylate | 0.06 | 0.06 |
| PHYSICAL PROPERTIES |  |  |
| Initial, 20*C/W + 50*C/1W |  |  |
| 50% MODULUS, kgf/cm$^2$ | 1.4 | 1.7 |
| Tensile Strength, kgf/cm$^2$ | 7.7 | 10.1 |
| Extension, % | 851 | 747 |
| CF rate | 100 | 100 |
| Initial + 90*C/1W |  |  |
| 50% MODULUS, kgf/cm$^2$ | 1.4 | 2.3 |
| Tensile Strength, kgf/cm$^2$ | 7.4 | 13.7 |
| Extension, % | 741 | 600 |
| CF rate | 100 | 100 |
| Initial + 50*C warm water/1W |  |  |
| 50% MODULUS, kgf/cm$^2$ | 1.0 | 2.8 |
| Tensile Strength, kgf/cm$^2$ | 6.3 | 9.9 |
| Extension, % | 760 | 578 |
| CF rate | 100 | 100 |

*ingredients in table are in parts by weight

Effect of the Invention

Because the room temperature-curing silicone elastomer composition of the present invention has ingredients (A), (B), (C), and (D), and in particular that it contains special siloxane (B), it exhibits excellent workability before curing and forms silicone rubber with low modulus and high elongation, and has excellent durability after curing.

That which is claimed is:

1. A room temperature-curing silicone elastomer composition comprising
   (A) 100 parts by weight of a silanol terminated substantially straight chain polyorganosiloxane having a viscosity at 25° C. of from 0.00002 to 1 m$^2$/s,
   (B) 0.1 to 20 parts by weight per 100 parts by weight of (A) of a siloxane expressed by the formula $R^1(R^2{}_n R^3{}_{(3-n)}SiO)Si(OR^4)_2$ in which $R^1$, $R^2$, and $R^3$ are aliphatic monovalent hydrocarbon groups, $R^4$ is a hydrocarbon group having from 1 to 8 carbon atoms per group, and n is 0 or 1,
   (C) 0.01 to 20 parts by weight per 100 parts by weight of (A) of an organosilane expressed by $R^5{}_{(4-a)}Si(OR^4)_a$ where $R^4$ is the same as defined in (B), and $R^5$ is a monovalent hydrocarbon group having from 1 to 20 carbon atoms per group, and a is 3 or 4, or its partially hydrolyzed product, and
   (D) 0.01 to 20 parts by weight per 100 parts by weight of (A) of a curing catalyst.

2. The room temperature-curing silicone elastomer composition according to claim 1, in which $R^1$ and $R^2$ are vinyl groups, $R^3$ is a methyl group, and n is 1.

3. The room temperature-curing silicone elastomer composition according to claim 1, in which $R^1$ is a vinyl group, $R^3$ is a methyl group, and n is 0.

4. The room temperature-curing silicone elastomer composition according to claim 1, in which $R^1$ and $R^3$ are methyl groups, and n is 0.

5. The room temperature-curing silicone elastomer composition according to claim 1, in which the curing catalyst is tin base compound.

6. The room temperature-curing silicone elastomer composition according to claim 1, in which the curing catalyst is a mixture of 10 to 90 weight % of dibutyltinbis(acetylacetonate) and 90 to 10 weight % of tin octylate.

7. The room temperature-curing silicone elastomer composition according to claim 2, in which (C) is a silane of the formula C$_{10}$H$_{21}$Si (OCH$_3$)$_3$.

8. The room temperature-curing silicone elastomer composition according to claim 7, in which (D) is dibutyltinbisacetylacetonate.

9. The room temperature-curing silicone elastomer composition according to claim 7, in which (D) is a mixture of 10 to 90 weight % of dibutyltinbisacetylacetonate and 90 to 10 weight % of tin octylate.

10. The room temperature-curing silicone elastomer composition according to claim 2, in which (C) is vinyltrimethoxysilane.

11. The room temperature-curing silicone elastomer composition according to claim 10, in which (D) is a mixture of 10 to 90 weight % of dibutyltinbisacetylacetonate and 90 to 10 weight % of tin octylate.

12. The room temperature-curing silicone elastomer composition according to claim 3, in which (C) is C$_{10}$H$_{21}$Si (OCH$_3$)$_3$.

13. The room temperature-curing silicone elastomer composition according to claim 12, in which (D) is a mixture of 10 to 90 weight % of dibutyltinbisacetylacetonate and 90 to 10 weight % of tin octylate.

14. The room temperature-curing silicone elastomer composition according to claim 1 further comprising a filler.

15. The room temperature-curing silicone elastomer composition according to claim 6 further comprising a filler.

16. The room temperature-curing silicone elastomer composition according to claim 8 further comprising a filler.

17. The room temperature-curing silicone elastomer composition according to claim 11 further comprising a filler.

18. The room temperature-curing silicone elastomer composition according to claim 13 further comprising a filler.

* * * * *